United States Patent [19]

Okuzono et al.

[11] Patent Number: 4,612,343
[45] Date of Patent: Sep. 16, 1986

[54] COLORED POLYMER EMULSION AND PROCESS FOR PREPARATION THEREOF

[75] Inventors: Shuichi Okuzono, Shinnanyo; Yasuhiro Oda, Tokuyama; Takashi Shintani, Tokuyama; Noriaki Emura, Tokuyama, all of Japan

[73] Assignee: Toya Soda Manufacturing Co., Ltd., Shinnanyo, Japan

[21] Appl. No.: 751,732

[22] Filed: Jul. 3, 1985

[30] Foreign Application Priority Data

Jul. 6, 1984 [JP] Japan .................................. 59-138972

[51] Int. Cl.$^4$ ............................................. C08L 43/02
[52] U.S. Cl. ..................................... 524/547; 524/807; 526/274
[58] Field of Search ............... 526/274, 275, 276, 277, 526/278; 524/547, 807

[56] References Cited

U.S. PATENT DOCUMENTS 3,449,303  6/1969  Caldwell .............................. 526/264
3,766,252 10/1973  Schmidt ............................... 526/278
4,177,179 12/1979  Kurihara .............................. 526/277
4,487,859 12/1984  Martino ............................... 524/807

Primary Examiner—Paul R. Michl
Attorney, Agent, or Firm—Cushman, Darby & Cushman

[57] ABSTRACT

A colored polymer emulsion having dispersed therein particles of a copolymer having at least $2 \times 10^{-5}$ g-eq./g of the copolymer, of a phosphoric acid group or salt thereof. The copolymer particles have an average particle size of not larger than 1 μm and a minimum film-forming temperature of not higher than 35° C., and have been dyed with a basic dye. The emulsion is capable of forming a film having an improved water resistance and light resistance. The emulsion is prepared by polymerizing a monomer mixture comprising (a - 1) a monomer having a phosphoric acid group or a salt thereof, (a - 2) a hydrophobic monomer and (b) a optional hydrophilic monomer by an emulsion polymerization procedure, and then incorporating a basic dye to the obtained polymer emulsion, or by carrying out the emulsion polymerization in the presence of a basic dye.

20 Claims, No Drawings

COLORED POLYMER EMULSION AND PROCESS FOR PREPARATION THEREOF

BACKGROUND OF THE INVENTION (1) Field of Invention

The present invention relates to a colored polymer emulsion having a film-forming property at normal temperatures, and to the process for the preparation of the colored polymer emulsion.

This colored polymer emulsion is valuable as a base material of an aqueous ink and can be widely used as a coloring material for paper, fibers, and wooden articles.

(2) Description of the Related Art

Inorganic and organic pigments have been used for the coloration of an aqueous polymer emulsion. Furthermore, an aqueous solution of an acid dye or direct dye has been used as a coloring material.

However, coloration with pigments is unsatisfactory in that the kinds of colors obtainable from pigments are limited, it is impossible to obtain the desired high color density, and pigments are generally expensive. Moreover, to attain the intended coloring effect of pigments in an aqueous ink, before application of the pigments, it is necessary to pulverize the pigments by various means and disperse the resulting fine particles in water by using a large amount of a dispersant or dispersion stabilizer.

In the conventional method for coloring a polymer emulsion with a pigment dispersion as mentioned above, the polymer emulsion acts as a binder for the water-insoluble pigment particles and the polymer per se in the polymer emulsion is not colored.

Where an aqueous solution of an acid dye or direct dye is used as a colorant, since the colorant is water-soluble, the water resistance of the coloring material after drying is extremely poor, and bleeding of the color is caused by immersion in water or sweating, or sometimes color wash-out occurs. Also, in this case, the polymer in the polymer emulsion is not colored.

As means for overcoming these disadvantages, a proposal has been made in which colored particles of an acrylonitrile type polymer are used as the colorant for an aqueous polymer emulsion (see Japanese Unexamined Patent Publication No. 52-80340).

In this proposed method, in order to obtain a finely divided polymer such that colored polymer particles can be used as the colorant, it is necessary to adopt a very special polymerization process (for example, the polymerization is carried out at a temperature of at least 120° C. under a high pressure of 5 to 50 atmospheres). Moreover, the composition of monomers constituting the polymer particles is extremely limited and the polymer particles cannot be used in the field where a film-forming property or softness is required.

SUMMARY OF THE INVENTION

The present invention is intended to solve the above-mentioned problems involved in the conventional methods for coloring an aqueous polymer emulsion by using the above-mentioned pigment dispersion or colored polymer particles. Namely, it is a primary object of the present invention to provide a colored polymer emulsion, in which copolymer particles constituting the colored aqueous polymer emulsion have been dyed with a basic dye and possess appropriate softness and film-forming properties at normal temperatures, and which is capable of forming a film having improved water resistance and light resistance.

In one aspect of the present invention, there is provided a colored polymer emulsion comprising particles of a copolymer having at least $2 \times 10^{-5}$ gram-equivalent, per gram of the copolymer, of a phosphoric acid group or a salt thereof, these copolymer particles having an average particle size of not larger than 1 μm and a minimum film-forming temperature of not higher than 35° C., and having been dyed with a basic dye.

In another aspect of the present invention, there is provided a process for the preparation of colored polymer emulsions, which comprises emulsion-polymerizing (a) at least 90 g, based on 100 g of the total monomers, of a hydrophobic monomer mixture comprising (a-1) at least $2 \times ^{-3}$ gram-equivalent of a monomer having a phosphoric acid group or a salt thereof and (a-2) at least 20 g, based on 100 g of the total monomers, of at least one hydrophobic monomer, and (b) 0 to 10 g, based on 100 g of the total monomers, of a hydrophilic monomer in 35 to 80% by weight, based on the total amount of the monomers and water, of water at a temperature of not higher than 100° C., and then incorporating a basic dye to the obtained polymer emulsion; or carrying out the emulsion polymerization in the presence of a basic dye.

DESCRIPTION OF THE PREFERRED EMBODIMENTS

The copolymer in the emulsion of the present invention has at least $2 \times 10^{31\ 5}$ gram-equivalent, preferably at least $5 \times 10^{-5}$ gram-equivalent, per gram of the copolymer, of a phosphoric acid group or a salt thereof. The particles of the copolymer have an average particle size substantially not larger than 1 μm, preferably not larger than 0.3 μm, and are dyed with a basic dye.

The phosphoric acid group or the salt thereof is incorporated in the copolymer by copolymerization of a monomer having a phosphoric acid group or a salt thereof. Such monomers include, for example, 2-hydroxyethylacryloyl phosphate, 2-hydroxyethylmethacryloyl phosphate, 3-chloro-2-acid-phosphoxypropyl methacrylate, and salts thereof, such as sodium, potassium, and ammonium salts.

By copolymerizing a monomer as mentioned above with other monomers, the phosphoric acid group or its salt can be easily introduced into the copolymer particles in an amount of at least $2 \times 10^{-5}$ gram-equivalent/gram of the copolymer, preferably at least $5 \times 10^{-5}$ gram-equivalent/gram of the polymer. If the amount of the introduced phosphoric acid group or its salt is too small, the stability of the emulsion is poor and the amount of the basic dye combined with the copolymer particles is reduced. On the other hand, if the amount of the monomer having a phosphoric acid group or a salt thereof is increased, problems such as the formation of an aggregation product of the polymer and increase of the viscosity occur. Accordingly, from the practical viewpoint, it is preferred that the amount of the phosphoric acid group or its salt be not larger than $2 \times 10^{-3}$ gram-equivalent/gram of the copolymer, more preferably, not larger than $1.3 \times 10^{-3}$ gram-equivalent/gram of the copolymer. The amount of the phosphoric acid group or its salt may be determined by neutralization titration of the emulsion.

The hydrophobic monomer, which is used in combination with the monomer having a phosphoric acid group or a salt thereof in the present invention, is selected by taking into consideration such properties of the colored copolymer obtained from the colored polymer emulsion of the present invention as the film-forming property, softness, physical strength, hardness and adhesiveness.

In order to form a colored uniform continuous film at normal temperatures, it is necessary to impart to a polymer emulsion the ability to form a film at a temperature not higher than 35° C.

It is known that the minimum film-forming temperature of a polymer emulsion is ordinarily influenced by the particle size of the polymer emulsion, the emulsifier or protecting colloid used, and the polymer concentration, but this temperature can be greatly varied depending upon the particular composition of the monomers constituting polymer particles in the emulsion.

The hydrophobic monomers used for the production of the colored polymer emulsion, together with the monomer having a phosphoric acid group or a salt thereof, are classified into two groups, i.e., monomers of group (A) providing a polymer having a relatively low film-forming temperature by polymerization, and monomers of group (B) providing a polymer having a relatively high film-forming temperature by polymerization.

The monomer of group (A) is an indispensable component in carrying out the present invention. The monomer of group (B) is not an indispensable component but it may be used for adjusting the softness, hardness, and adhesiveness of the intended polymer. Namely, an increased use of the monomer of group (B), causes the intended polymer to have an increased hardness and a reduced adhesiveness. In this case, the colored polymer of the present invention can be obtained by using at least 20 parts by weight, based on 100 parts by weight of the total monomers, of at least one monomer of group (A) in combination with at least one monomer of group (B). Of course, as can be seen from the gist of the present invention, there may be adopted a monomer composition comprising at least one monomer of group (A) in addition to the monomer having a phosphoric acid group or a salt thereof.

As the hydrophobic monomer belonging to group (A), there can be mentioned ethylene, isobutylene, butadiene, isoprene, chloroprene, methyl acrylate, ethyl acrylate, n-propyl acrylate, n-butyl acrylate, t-butyl acrylate, isobutyl acrylate, n-hexyl acrylate, cyclohexyl acrylate, n-octyl acrylate, 2-ethylhexyl acrylate, dodecyl acrylate, tetradecyl acrylate, n-propyl methacrylate, n-butyl methacrylate, t-butyl methacrylate, isobutyl methacrylate, n-hexyl methacrylate, n-octyl methacrylate, 2-ethylhexyl methacrylate, dodecyl methacrylate, vinyl acetate, vinyl propionate, and vinylidene chloride.

As the hydrophobic monomer belonging to group (B), there can be mentioned styrene, methylstyrene, chlorostryrene, methyl methacrylate, ethyl methacrylate, acrylonitrile, and methacrylonitrile.

In carrying out the present invention, a hydrophilic monomer may be copolymerized, in so far as the stability of the emulsion is not impaired. Usually, the amount of the hydrophilic monomer is 0 to 10 parts by weight based on 100 parts by weight of the total monomers. The hydrophilic monomers used include, for example, acrylic acid, methacrylic acid, itaconic acid, acrylamide, methacrylamide, 2-hydroxyethyl acrylate, 2-hydroxyethyl methacrylate, aminoethyl acrylate, and aminoethyl methacrylate.

The colored polymer emulsion of the present invention may contain a sulfonic acid group or a salt thereof in addition to at least $2 \times 10^{-5}$ gram-equivalent/gram of the polymer of the phosphoric acid group or its salt. By the introduction of the sulfonic acid group or a salt thereof, the resistance to light can be further improved. Introduction of the sulfonic acid group or its salt can be accomplished by copolymerizing the above-mentioned monomers in water in the presence of an ethylenically unsaturated sulfonic acid or a salt thereof. As the ethylenically unsaturated sulfonic acid or its salt, there can be mentioned vinylsulfonic acid, allylsulfonic acid, methallylsulfonic acid, styrene-sulfonic acid, 2-acrylamido-2-methylpropane-sulfonic acid, vinylbenzylsulfonic acid, acryloyloxyethylsulfonic acid, methacryloyloxyethylsulfonic acid, and salts of these unsaturated sulfonic acids, such as lithium salts, sodium salts, potassium salt, and ammonium salt.

When the amount of the sulfonic acid group introduced into the polymer is increased, the size of the polymer particles is greatly reduced and the viscosity of the polymer emulsion becomes very high, and therefore, preparation of a polymer emulsion having a high concentration becomes difficult. Accordingly, from the practical viewpoint, it is preferred that the amount of the sulfonic acid group introduced into the polymer be not larger than $5 \times 10^{-4}$ gram-equivalent/gram of the polymer. The amount of the sulfonic acid group in the polymer may be determined by measuring the amount of sulfur by the combustion method.

For the above-mentioned polymerization, there may be used an ordinary radical polymerization initiator, for example, a persulfate such as potassium persulfate or ammonium persulfate, or an organic peroxide such as cumene hydroperoxide or t-butyl hydroperoxide. Furthermore, a redox type initiator may be used in combination with a reducing agent such as an acidic sulfite or ferrous sulfate.

Polymerization can be accomplished by introducing the monomer components collectively, separately, or continuously to a polymerization vessel according to customary emulsion polymerization procedures. To remove the polymerization heat or perform the copolymerization efficiently, preferably the respective components are added dividedly or continuously. A surface active agent or protecting colloid customarily used for emulsion polymerization, for example, polyvinyl alcohol, may be made present in the polymerization reaction system. The polymerization is sufficiently advanced at a temperature not higher than 100° C. However, the polymerization is ordinarily carried out at 30° C. to 90° C.

In the case of a reaction using water as the solvent, such as the reaction for the production of the polymer emulsion of the present invention, if it is intended to carry out the reaction at a temperature higher than the boiling point of water (100° C. under 1 atmosphere), the reaction should be conducted under an elevated pressure higher than 1 atmosphere, and pressure-resistant reaction vessel and equipment should be used. Accordingly, some problems will occur when the reaction is carried out at a high temperature exceeding 100° C.

In the process where the colored polymer emulsion is prepared by carrying out the emulsion polymerization in the presence of a basic dye, the dye may be added collectively, dividedly, or continuously to the polymerization system. Furthermore, the dye may be added in the form of an aqueous solution or monomer solution.

Where the polymerization is carried out in the presence of a basic dye, in view of the stability of the dye against discoloration or fading, preferably the polymerization is carried out at a pH value adjusted to 2 to 7.

The average particle size of copolymer particles obtained by the above-mentioned polymerization process depends on the kind and amount of the surface active agent present in the polymerization system, the amount used of the ethylenically unsaturated sulfonic acid or its salt, the amount used of the polymerization initiator, the amount of water, and the polymerization temperature. In general, as the amounts of the surface active agent and the ethylenically unsaturated sulfonic acid or its salt are increased, the particle size tends to become small, and as the amount used of the polymerization initiator is increased, the particle size tends to become small. Moreover, as the amount used of water is reduced, the particle size tends to become large.

If the average particle size of the copolymer particles in the polymer emulsion is larger than 1 μm, the storage stability of the colored polymer emulsion is degraded. A higher concentration of the polymer emulsion is advantageous from the economical viewpoint, but if the amount of water in the polymer emulsion is smaller than 35% by weight, the viscosity of the polymer emulsion is increased to such an extent that the flowability of the polymer emulsion is lost, and the preparation of the polymer emulsion is often difficult. An amount of water exceeding 80% by weight is not preferred from the economical viewpoint.

Dyeing of the thus-obtained polymer emulsion can be accomplished by adding an aqueous solution of a basic acid to the polymer emulsion according to a customary dyeing method. Moreover, dyeing can be performed by making a basic dye present in the emulsion polymerization system for the production of the polymer emulsion.

As the basic dye (the term "basic dye" is used in a broad sense including even a cationic dye in the instant specification), there can be used ordinary triphenylmethane dyes, azo dyes, methine dyes, oxazine dyes, and anthraquinone dyes.

As a simple means for industrially dyeing polymer particles after the preparation of an aqueous polymer emulsion, there is a method in which the pH value of the polymer emulsion is adjusted to 2 to 7, preferably 3 to 5, by an organic acid such as formic acid, acetic acid, butyric acid, tartaric acid or malic acid, an inorganic acid such as hydrochloric acid or sulfuric acid, or an aqueous solution of sodium hydroxide or sodium carbonate, and then an aqueous solution of a basic dye is added to the polymer emulsion.

The colored polymer emulsion of the present invention can be utilized as an aqueous ink. More specifically, since the copolymer particles per se in the polymer emulsion are dyed and the minimum film-forming temperature of the colored polymer emulsion is not higher than 35° C., a uniform continuous colored film can be directly formed by normal-temperature drying and the formed film is characterized by a very high water resistance. Accordingly, a water-insoluble colored film is formed by printing, recording or writing, and the defects of conventional aqueous inks, such as bleeding by immersion in water or by sweat, and the disappearance or washing-out of the printed portion by immersion water or by sweat or by friction, can be completely overcome.

The colored polymer emulsion of the present invention has the film-forming property at normal temperatures as described hereinbefore. In the case of a polymer emulsion having a minimum film-forming temperature higher than 35° C., a uniform continuous film cannot be formed at normal temperatures, and therefore, printing, recording or writing with this polymer emulsion is impossible, or peeling of the printed portion by friction or the like occurs.

Furthermore, in accordance with the present invention, the light resistance of a basic dye or cationic dye which is characterized by a high color sharpness but has a defect of a poor light fastness is improved when it is combined in a polymer. Accordingly, the second characteristic feature of the present invention resides in the provision of an aqueous ink having a sharp color and an improved light fastness.

The aqueous colored polymer emulsion of the present invention having the above-mentioned characteristics can be directly used as an aqueous ink, but it may be used after various additives customarily used for aqueous inks, such as a drying property-adjusting agent and an antiseptic agent, are added to the aqueous colored polymer emulsion of the present invention.

The colored polymer emulsion of the present invention may be widely used as a colorant for paper, fibers, and wooden articles, as well as aqueous ink, and such characteristics as high color sharpness and high water resistance are effectively utilized.

The present invention will now be described in detail with reference to the following examples that by no means limit the scope of the invention.

In the examples, all of "parts" and "%" are by weight unless otherwise indicated, and the average particle size of the polymer emulsion is determined by the turbidity method.

The minimum film-forming temperature of the colored polymer emulsion was determined by using an apparatus provided with a temperature gradient plate, which apparatus was fabricated according to the proposal of Protzmann et al [T.F. Protzmann and G.L. Brown, J. Appl. Polym. Sci., 4, 81 (1960)].

The light fastness was determined according to the following method.

A colored polymer emulsion having a solid content adjusted to 20% by weight was coated on an art paper by using a 1-mil doctor blade, and the coated paper was dried at room temperature to obtain a test sheet. This test sheet was exposed to rays from a carbon arc lamp for 20 hours and the value ΔE of the Lab color specification system was determined by a colorimetric color-difference meter (Model Z-1001DP supplied by Nippon Denshoku Kogyo K.K.).

EXAMPLE 1

In a vessel in which the inner atmosphere was substituted with nitrogen, a monomer emulsion comprising 50 g of methyl methacrylate, 64 g of n-butyl acrylate, 9.8 g of Light Ester P-M (2-hydroxyethylmethacryloyl phosphate supplied by Kyoeisha Yushi Kagaku Kogyo K.K.), 71.4 g of water, 2.5 g of Nonion NS-230 (alkylphenol type non-ionic surface active agent supplied by Nippon Oil and Fats Co., Ltd.), and 2.5 g of Emulgen 950 (nonylphenyl ether type surface active agent supplied by Kao Corp.) was prepared in advance.

Then, a polymerization vessel was charged with 100 g of water in a nitrogen current, and the temperature was elevated. When the temperature reached 70° C., 0.2 g of ammonium persulfate was added. Subsequently, the above-mentioned monomer emulsion prepared in advance was added dropwise over a period of 2 hours and polymerization was carried out with stirring. After completion of the dropwise addition, the temperature was maintained at 70° C. for 3 hours, whereby polymerization was substantially completed.

The solid content of the thus-obtained polymer emulsion was 41%, and the average particle size was about 0.15 μm. The phosphoric acid group was contained in the polymer in an amount of $2.7\times10^{-4}$ gram-equivalent/gram of the polymer.

Then, the pH value of 150 g of the thus-obtained polymer emulsion was adjusted to 6 by addition of a 10% aqueous solution of sodium hydroxide, and a solution comprising 2 g of Kayacryl Red GRL-200 (cationic dye supplied by Nippon Kayaku Co., Ltd.), 0.5 g of a 10% aqueous solution of acetic acid, 20 g of water, 0.5 g of Nonion NS-230 and 0.5 g of Emulgen 950 was gradually added to the polymer emulsion and mixing was conducted at 80° C. Then, the mixture was further stirred at 80° C. for 2 hours and allowed to cool to room temperature.

The minimum film-forming temperature of the thus-obtained colored polymer emulsion was not higher than 5° C. When a part of the colored polymer emulsion was cast on a glass sheet and allowed to stand in a thermostat chamber maintained at 25° C., a transparent flexible colored film having a sharp color was obtained. When the film was immersed in water, dissolution of the dye was not observed.

Letters could be written on paper by a felt pen impregnated with the thus-obtained colored polymer emulsion, and the written letters had an excellent water resistance.

When the light fastness of the colored polymer emulsion was examined, it was found that the value ΔE was 5.2 and the light resistance was higher than that of the dye per se (ΔE =7.1).

EXAMPLE 2

In a vessel in which the inner atmosphere was substituted with nitrogen, a monomer dispersion comprising 50 g of methyl methacrylate, 64 g of n-butyl acrylate, 4.9 g of Light Ester P-A (2-hydroxyethylacryloyl phosphate supplied by Kyoeisha Yushi Kagaku Kogyo KK.), 5.7 g ot Spinomer NaSS (sodium p-styrenesulfonate having an effective component content of 81%, supplied by Toyo Soda Mfg. Co., Ltd.), 71.4 g of water, 0.5 g of Nonion NS-230, and 0.5 g of Emulgen 950 was prepared in advance.

A polymerization vessel was charged with 100 g of water in a nitrogen current and the temperature was elevated, and when the temperature reached 70° C., 0.2 g of ammonium persulfate was added. Subsequently, the monomer dispersion prepared in advance was added dropwise to the polymerization vessel over a period of 2 hours and polymerization was conducted with stirring. After completion of the dropwise addition, the mixture was maintained at 70° C. for 3 hours, whereby polymerization was substantially completed.

The solid content of the obtained polymer emulsion was 40%, and the average particle size was about 0.12 μm. The polymer contained the phosphoric acid group in an amount of $1.1\times10^{-4}$ gram-equivalent/gram of the polymer and the sulfonic acid group in an amount of $1.8\times10^{-4}$ gram-equivalent/gram of the polymer.

Then, a colored polymer emulsion was prepared from this polymer emulsion in the same manner as described in Example 1. The water resistance of a film obtained from this colored polymer emulsion was excellent. The light fastness of the colored polymer emulsion was excellent [the ΔE value was 2.8 (20 hours)]and higher than that of the colored polymer emulsion obtained in Comparative Example 1.

COMPARATIVE EXAMPLE 1

Polymerization was carried out in the same manner as described in Example 2 except that 4.9 g of Light Ester P-A was not used, whereby a polymer emulsion having a solid content of 40% and an average particle size of about 0.12 μm was obtained.

The sulfonic acid group was contained in the polymer in an amount of $1.9\times10^{-4}$ gram-equivalent/gram of the polymer.

The light fastness of the colored polymer emulsion prepared in the same manner as described in Example 1 was such that the value ΔE was 3.2 (20 hours).

EXAMPLE 3

A polymer emulsion was prepared by carrying out polymerization in the same manner as described in Example 2 except that the amount of Light Ester P-A was changed from 4.9 g to 9.8 g. The solid content of the obtained polymer emulsion was 41% and the average particle size was about 0.14 μm. The polymer contained the phosphoric acid group in an amount of $2.4\times10^{-4}$ gram-equivalent/gram of the polymer and the sulfonic acid group in an amount of $1.7\times10^{-4}$ gram-equivalent/gram of the polymer.

A colored polymer emulsion was prepared from this polymer emulsion in the same manner as described in Example 1, and the light resistance of the colored polymer emulsion was excellent and the light fastness ΔE (20 hours) was 2.9.

EXAMPLE 4

In a vessel in which the inner atmosphere was substituted with nitrogen, a monomer emulsion comprising 50 g of methyl methacrylate, 64 g of n-butyl acrylate, 9.8 g of Light Ester P-A, 16.1 g of Reactive Surfactant ER-120 (sodium methacryloyloxylaurylsulfonate having an effective component content of 50%, supplied by Kao Corp.) 67.4 g of water, and 1 g of Solgen TW-60 (sorbitan type non-ionic surface active agent supplied by Daiichi Kogyo Seiyaku Co., Ltd.) was prepared in advance.

A polymerization vessel was charged with 100 g of water in a nitrogen current. The temperature was elevated and when the temperature reached 70° C., 0.2 g of ammonium sulfate was added. While the monomer emulsion prepared in advance was added dropwise into the vessel over a period of 2 hours, polymerization was carried out with stirring. The mixture was maintained at 70° C. for 3 hours whereby polymerization was substantially completed.

The solid content of the obtained polymer emulsion was 42%, and the average particle size was about 0.10 μm. The polymer contained the phosphoric acid group in an amount of $2.3\times10^{-4}$ gram-equivalent/gram of the polymer and the sulfonic acid group in an amount of $1.7\times10^{-4}$ gram-equivalent/gram of the polymer.

A colored polymer emulsion was prepared from this polymer emulsion in the same manner as described in Example 1. The water resistance of a film obtained from this colored polymer emulsion was excellent, and the light fastness [the value ΔE was 3.2 (20 hours)]of the colored polymer emulsion was higher than that of the colored polymer emulsion obtained in Comparative Example 2.

COMPARATIVE EXAMPLE 2

A polymer emulsion was prepared by carrying out polymerization in the same manner as described in Example 4 except that 9.8 g of Light Ester P-A was not used. The solid content of the obtained polymer emulsion was 40%, and, the average particle size was about 0.10 μm. The polymer contained the sulfonic acid group in an amount of $1.7 \times 10^{-4}$ gram-equivalent/gram of the polymer.

A colored polymer emulsion was prepared from the thus-obtained polymer emulsion in the same manner as described in Example 1. The light fastness ΔE (20 hours) of the colored polymer emulsion was 4.2.

COMPARATIVE EXAMPLE 3

A polymerization vessel was charged with 171 g of water and 0.4 g of sodium laurylsulfate in a nitrogen current, and the temperature was elevated to 70° C. When the temperature reached 70°, 0.2 g of ammonium persulfate was added. While a liquid monomer mixture comprising 50 g of methyl methacrylate, 64 g of n-butyl acrylate and 3.6 g of acrylic acid was added dropwise into the vessel over a period of 2 hours, polymerization was carried out with stirring. After completion of the dropwise addition, the mixture was maintained at 70° C. for 3 hours, whereby polymerization was substantially completed.

The solid content of the polymer emulsion was 40%, and the average particle size was about 0.12 μm. The polymer contained the carboxylic acid group in an amount of $2.6 \times 10^{-4}$ gram-equivalent/gram of the polymer.

The obtained polymer emulsion was neutralized with a 10% aqueous solution of sodium hydroxide so that the pH value was adjusted to 6. A colored polymer emulsion was prepared from the obtained polymer emulsion in the same manner as described in Example 1. The light fastness ΔE (24 hours) of the colored polymer emulsion was 12.0 and inferior to the light fastness of the dye per se [ΔE =7.1 (20 hours)]. Thus, it was confirmed that the phosphoric acid group is effective for improving the light fastness.

1. A colored polymer emulsion comprising particles of a copolymer having at least $2 \times 10^{-5}$ gram-equivalent, per gram of the copolymer, of a phosphoric acid group or a salt thereof, said copolymer particles having an average particle size of not larger than 1 μm and a minimum film-forming temperature of not higher than 35° C. and having been dyed with a basic dye.

2. A colored polymer emulsion according to claim 1 wherein said copolymer is derived from, based on 100 g of the total monomers, (a) at least 90 g of a hydrophobic monomer mixture comprising (a - 1) at least $2 \times 10^{-3}$ gram-equivalent of a monomer having a phosphoric acid group or a salt thereof and (a - 2) at least 20 g of at least one hydrophobic monomer, and (b) 0 to 10 g of a hydrophilic monomer.

3. A colored polymer emulsion according to claim 1 wherein said copolymer particles have an average particle size of not larger than 0.3 μm.

4. A colored polymer emulsion according to claim 1 wherein said copolymer has $2 \times 10^{-5}$ to $2 \times 10^{-3}$ gram-equivalent, per gram of the copolymer, of a phosphoric acid group or a salt thereof.

5. A colored polymer emulsion according to claim 1 wherein said copolymer has $5 \times 10^{-5}$ to $1.3 \times 10^{-3}$ gram-equivalent, per gram of the copolymer, of a phosphoric acid group or a salt thereof.

6. A colored polymer emulsion according to claim 2 wherein said monomer having a phosphoric acid group or a salt thereof is selected from the group consisting of 2-hydroxyethylacryloyl phosphate, 2-hydroxyethylmethacryloyl phosphate, 3-chloro-2-acid-phosphoxypropyl methacrylate and their sodium, potassium, and ammonium salts.

7. A colored polymer emulsion according to claim 2 wherein said hydrophobic monomer (a - 2) is selected from the group consisting of ethylene, isobutylene, butadiene, isoprene, chloroprene, vinyl acetate, vinyl propionate, vinylidene chloride, methyl acrylate, ethyl acrylate, n-propyl acrylate, n-butyl acrylate, sec-butyl acrylate, t-butyl acrylate, isobutyl acrylate, n-hexyl acrylate, cyclohexyl acrylate, n-octyl acrylate, 2-ethylhexyl acrylate, dodecyl acrylate, tetradecyl acrylate, n-propyl methacrylate, n-butyl methacrylate, t-butyl methacrylate, sec-butyl methacrylate, isobutyl methacrylate, n-hexyl methacrylate, n-octyl methacrylate, 2-ethylhexyl methacrylate, and dodecyl methacrylate.

8. A colored polymer emulsion according to claim 2 wherein said hydrophilic monomer is selected from the group consisting of acrylic acid, methacrylic acid, itaconic acid, acrylamide, methacrylamide, 2-hydroxyethyl acrylate, 2-hydroxyethyl methacrylate, aminoethyl acrylate, and aminoethyl methacrylate.

9. A colored polymer emulsion according to claim 1 wherein said copolymer has $2 \times 10^{-5}$ to $5 \times 10^{-4}$ gram-equivalent, per gram of the copolymer, of a sulfonic acid group or a salt thereof.

10. A process for the preparation of colored polymer emulsions, which comprises emulsion-polymerizing (a) at least 90 g, based on 100 g of the total monomers, of a hydrophobic monomer mixture comprising (a - 1) at least $2 \times 10^{-3}$ gram-equivalent of a monomer having a phosphoric acid group or salt thereof and (a - 2) at least 20 g, based on 100 g of the total monomers, of at least one hydrophobic monomer, and (b) 0 to 10 g, based on 100 g of the total monomers, of a hydrophilic monomer in 35 to 80% by weight, based on the total amount of the monomers and water, of water at a temperature of not higher than 100° C., and then incorporating a basic dye to the obtained polymer emulsion; or carrying out said emulsion polymerization in the presence of a basic dye.

11. A process according to claim 10 wherein the amount of the monomer having a phosphoric acid group or a salt thereof is $2 \times 10^{-5}$ to $2 \times 10^{-3}$ gram-equivalent per gram of the resulting copolymer.

12. A process according to claim 10 wherein the amount of the monomer having a phosphoric acid group or a salt thereof is $5 \times 10^{-5}$ to $1.3 \times 10^{-3}$ gram-equivalent per gram of the resulting copolymer.

13. A process according to claim 10 wherein said monomer having a phosphoric acid group or a salt thereof is selected from the group consisting of 2-hydroxyethylacryloyl phosphate, 2-hydroxyethylmethacryloyl phosphate, 3-chloro-2-acid-phosphoxypropyl methacrylate and their sodium, potassium, and ammonium salts.

14. A process according to claim 10 wherein said hydrophobic monomer (a −2) is selected form the group consisting of ethylene, isobutylene, butadiene, isoprene, chloroprene, vinyl acetate, vinyl propionate, vinylidene chloride, methyl acrylate, ethyl acrylate, n-propyl acrylate, n-butyl acrylate, sec-butyl acrylate, t-butyl acrylate, isobutyl acrylate, n-hexyl acrylate, cyclohexyl acrylate, n-octyl acrylate, 2-ethylhexyl acrylate, dodecyl acrylate, tetradecyl acrylate, n-propyl methacrylate, n-butyl methacrylate, t-butyl methacrylate, sec-butyl methacrylate, isobutyl methacrylate, n-hexyl methacrylate, n-octyl methacrylate, 2-ethylhexyl methacrylate, and dodecyl methacrylate.

15. A process according to claim 10 wherein said hydrophilic monomer is selected from the group consisting of acrylic acid, methacrylic acid, itaconic acid, acrylamide, methacrylamide, 2-hydroxyethyl acrylate, 2-hydroxyethyl methacrylate, aminoethyl acrylate, and aminoethyl methacrylate.

16. A process according to claim 10 wherein at least part of said hydrophilic monomer is a monomer having a sulfonic acid group or a salt thereof.

17. A process according to claim 16 wherein the amount of the monomer having a sulfonic acid group or a salt thereof is $2 \times 10^{-5}$ to $5 \times 10^{-4}$ gram-equivalent per gram of the resulting copolymer.

18. A process according to claim 16 wherein said monomer having a sulfonic acid group or a salt thereof is selected from the group consisting of vinylsulfonic acid, allylsulfonic acid, methallylsulfonic acid, styrenesulfonic acid, 2-acrylamido-2-methylpropanesulfonic acid, vinylbenzylsulfonic acid, acryloyloxyethylsulfonic acid, methacryloyloxyethylsulfonic acid, and their lithium, sodium, potassium, and ammonium salts.

19. A process according to claim 10 wherein said emulsion polymerization is carried out in the presence of a basic dye and at a pH value of 2 to 7.

20. A process according to claim 10 wherein a basic dye is incorporated in the polymer emulsion at a pH value of 2 to 7.

* * * * *